(12) United States Patent  (10) Patent No.: US 8,651,658 B2
Forgan  (45) Date of Patent: Feb. 18, 2014

(54) MASKS

(71) Applicant: Anglo Italian Optical Limited, Haverhill (GB)

(72) Inventor: Robert John Forgan, Somerset (GB)

(73) Assignee: Anglo Italian Optical Limited, Haverhill, Suffolk (GB)

( * ) Notice: Subject to any disclaimer, the term of this patent is extended or adjusted under 35 U.S.C. 154(b) by 0 days.

(21) Appl. No.: 13/661,772

(22) Filed: Oct. 26, 2012

(65) Prior Publication Data

US 2013/0107197 A1   May 2, 2013

(30) Foreign Application Priority Data

Oct. 29, 2011 (GB) .................................. 1118817.4
Apr. 18, 2012 (GB) .................................. 1206783.1

(51) Int. Cl.
  *G02C 1/00* (2006.01)
(52) U.S. Cl.
  USPC .................................. 351/43; 351/47; 2/426

(58) Field of Classification Search
  USPC .......... 351/43, 47, 48, 57, 58, 41, 158; 2/426, 2/13, 428
  See application file for complete search history.

(56) References Cited

U.S. PATENT DOCUMENTS

| 5,764,332 | A  | * | 6/1998  | Kranhouse    | 351/43 |
| 5,929,963 | A  | * | 7/1999  | McNeal       | 351/47 |
| 6,386,703 | B1 | * | 5/2002  | Huang        | 351/57 |
| 6,749,299 | B1 | * | 6/2004  | Hsu          | 351/62 |
| 7,192,134 | B2 | * | 3/2007  | Teng         | 351/47 |
| 7,204,589 | B2 | * | 4/2007  | Pieterman    | 351/47 |
| 7,396,124 | B1 | * | 7/2008  | Wang         | 351/47 |
| 7,461,935 | B2 | * | 12/2008 | Collier et al. | 351/47 |
| 7,540,606 | B2 | * | 6/2009  | Huang        | 351/57 |

* cited by examiner

*Primary Examiner* — Hung Dang
(74) *Attorney, Agent, or Firm* — Ware, Fressola, Maguire & Barber LLP

(57) ABSTRACT

An aquatic mask comprises an outer mask structure (20 or 30) including one or more lenses, and an inner frame (10) suitable for containing ophthalmic corrective lenses. The outer mask structure (20 or 30) and the inner frame (10) include complementary formations (21 or 31 and 11 and 12) whereby the inner frame (10) can have a resilient push-fit engagement with the outer mask structure (20 or 30).

1 Claim, 8 Drawing Sheets

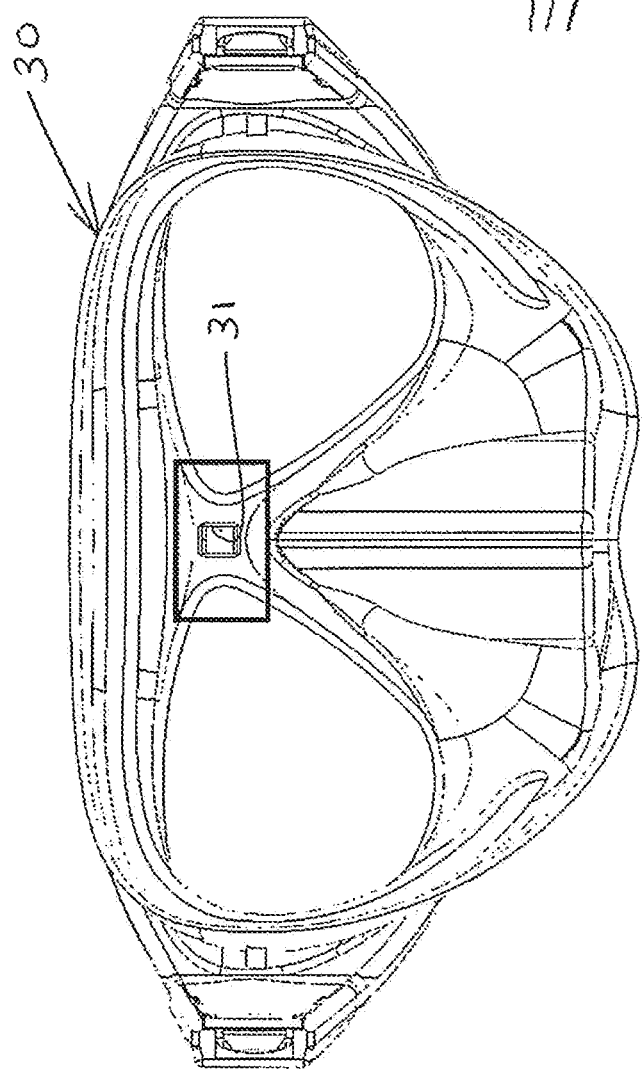
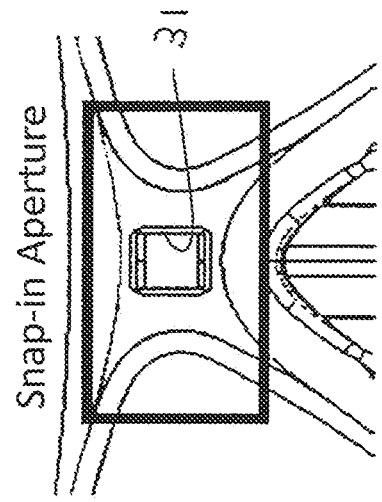
FIGURE 2
FIGURE 2A
Diving Mask rear view
Snap-in Aperture

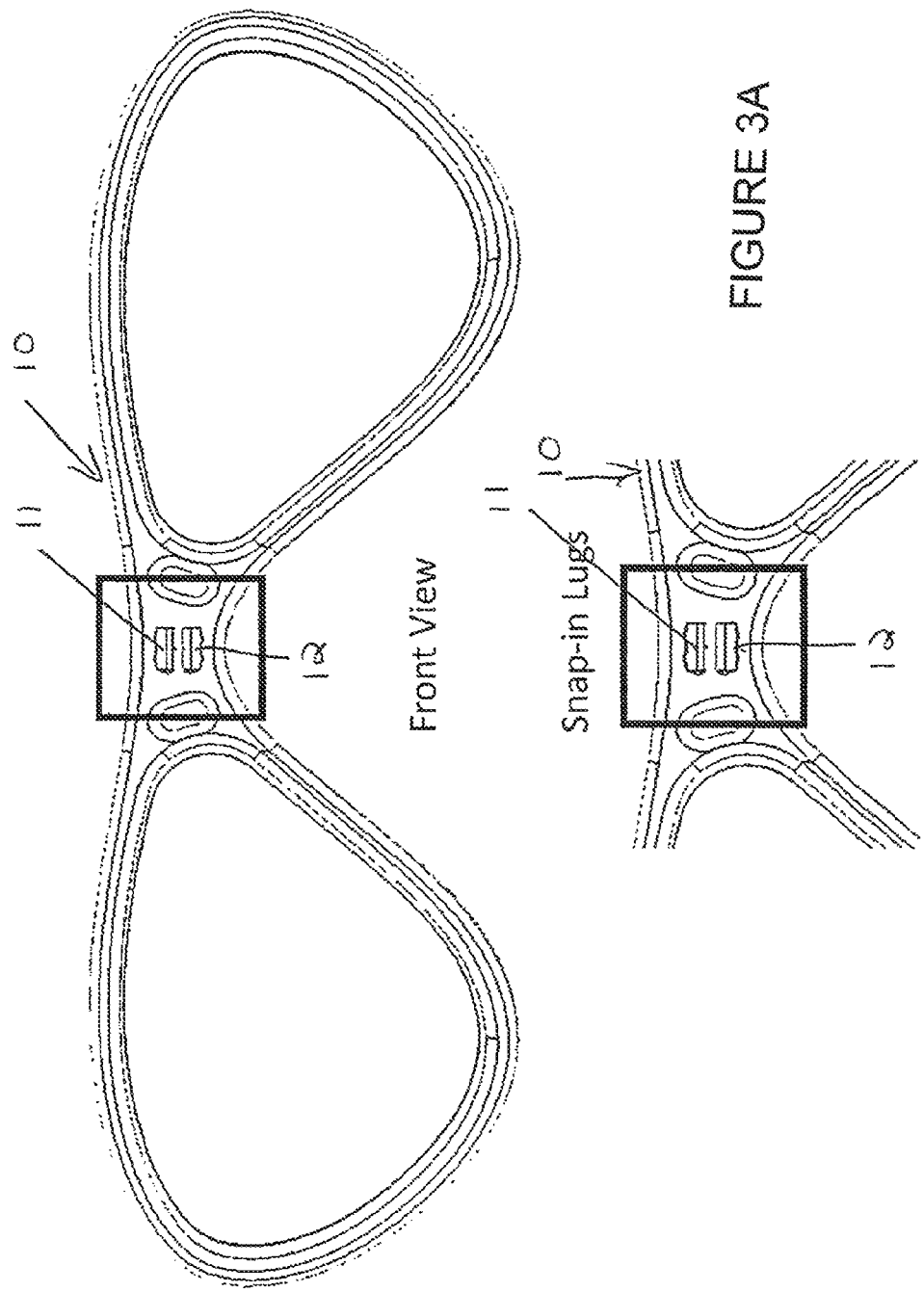

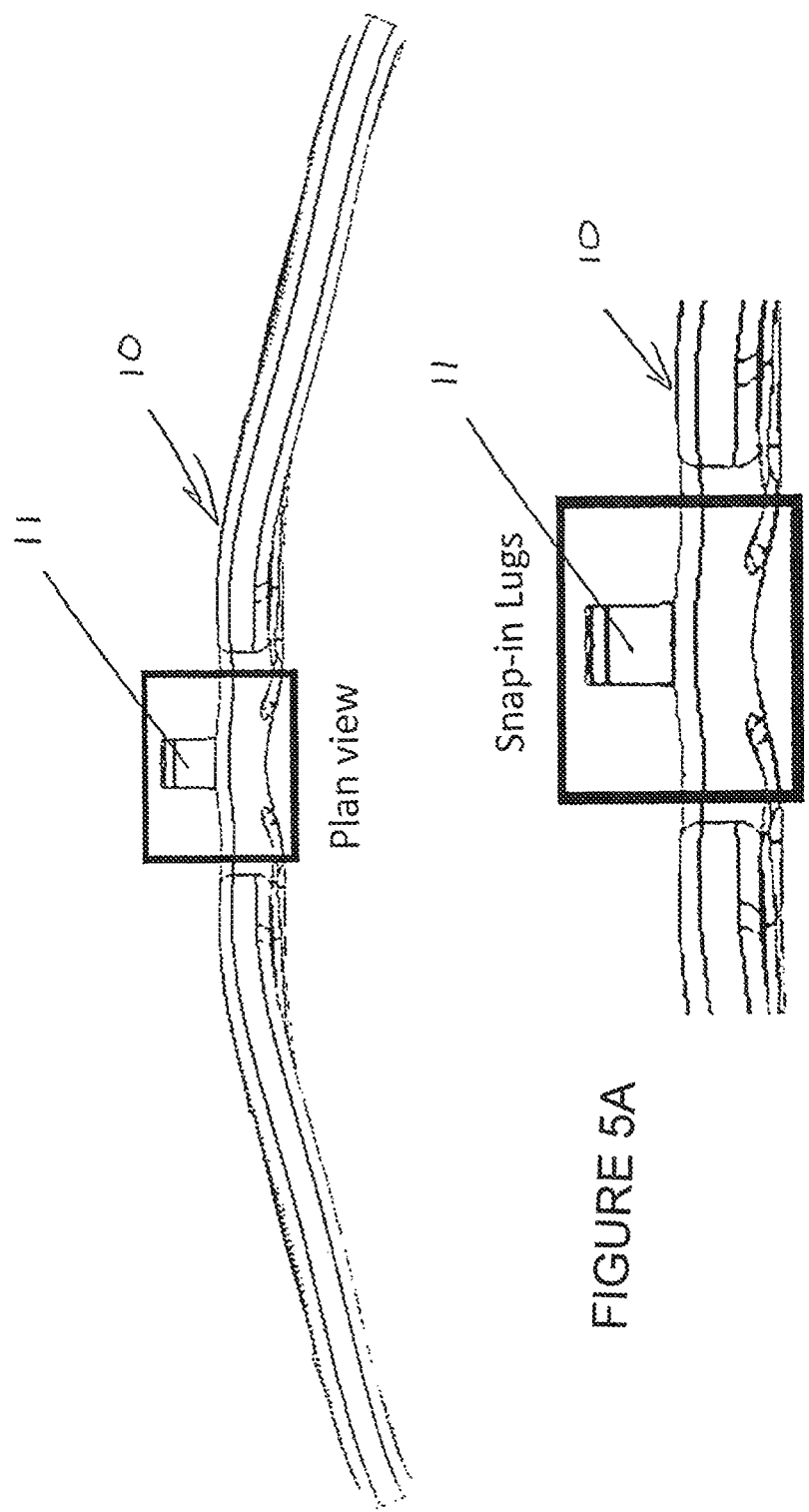

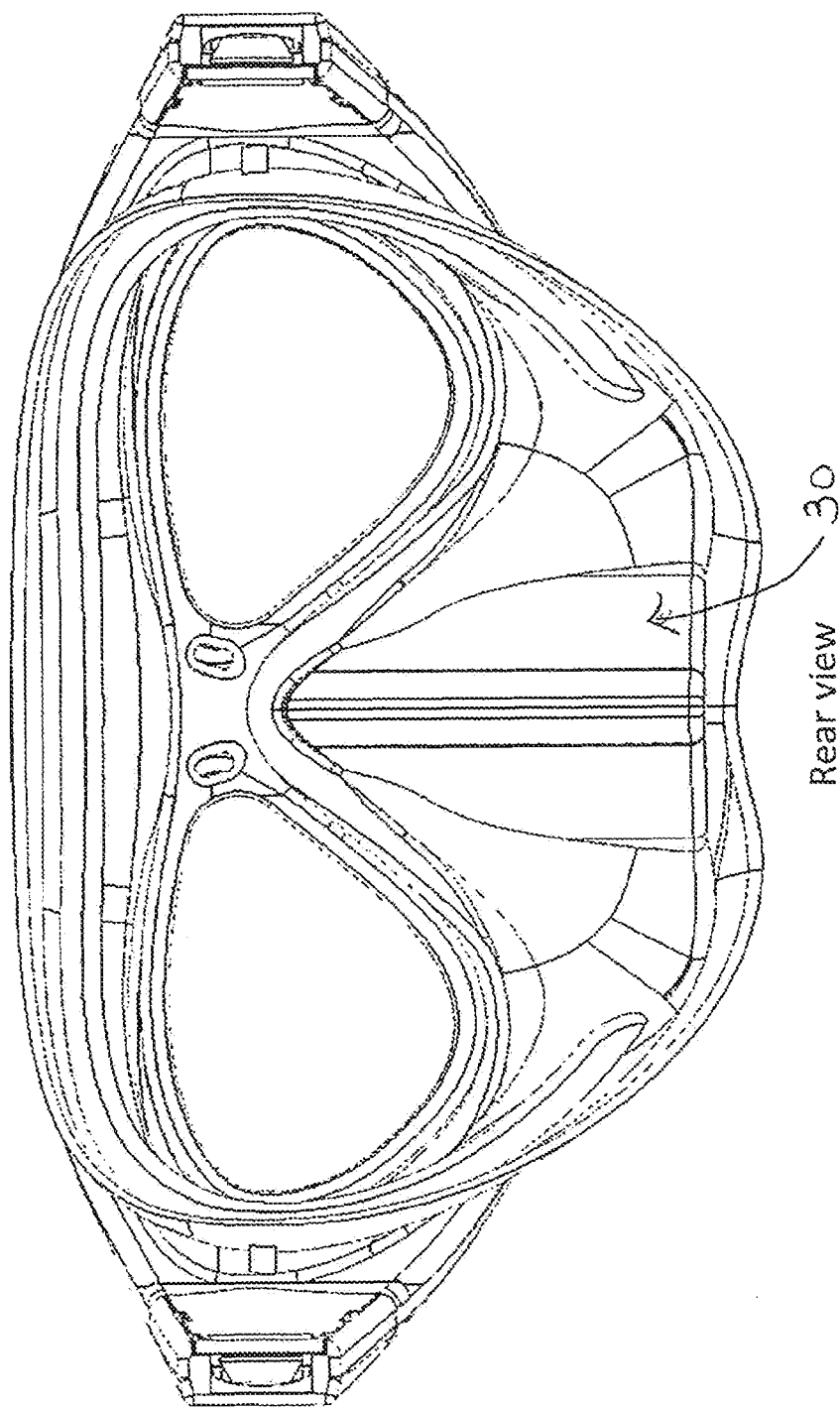

MASKS

CROSS-REFERENCE TO RELATED APPLICATIONS

This application claims priority under 35 USC §119 to British Patent Application No. 1118817.4 filed on Oct. 29, 2011 and British Patent Application No. 1206783.1 filed on Apr. 18, 2012, which applications are hereby incorporated by reference.

FIELD OF THE INVENTION

This invention relates to masks and, in particular, to diving masks and swimming masks, hereinafter referred to generically as "aquatic masks".

With the increasing popularity of aquatic activities, there is a requirement for people who normally wear glasses or contact lenses to be able to participate effectively in such activities and it is an object of the present invention to meet this requirement.

SUMMARY OF THE INVENTION

According to the present invention there is provided an aquatic mask comprising:
   a) an outer mask structure including a pair of spaced lenses,
   b) a generally rectangular cross-section aperture formed in the outer mask structure between the two lenses,
   c) an inner frame including a pair of corrective lenses, and
   d) a protrusion extending forwardly from the inner frame between the two corrective lenses, the protrusion comprising a pair of resiliently deformable substantially parallel lugs that have a push-fit engagement in the aperture in the outer mask structure.

BRIEF DESCRIPTION OF THE DRAWINGS

FIG. 1A is a detail view of part of the swimming mask, FIG. 2 is a rear view of a diving mask according to the present invention, with fitting point aperture for snap-in inner frame suitable for containing ophthalmic corrective lenses to wearers individual prescription, FIG. 2A is a detail view of part of the diving mask, FIG. 3 is a front view of an inner frame according to the present invention, capable of being fitting with ophthalmic corrective lenses to wearers individual prescription, FIG. 3A is a detail view of part of the inner frame, FIG. 5 is a plan view of the inner frame according to the present invention, capable of being fitted with ophthalmic corrective lenses to wearers individual prescription, FIG. 5A is a corresponding detail view of part of the inner frame, FIG. 8 is a rear view of the diving mask of FIG. 2 with the inner frame fitted in position.

DESCRIPTION OF THE PREFERRED EMBODIMENTS

Figure 1:
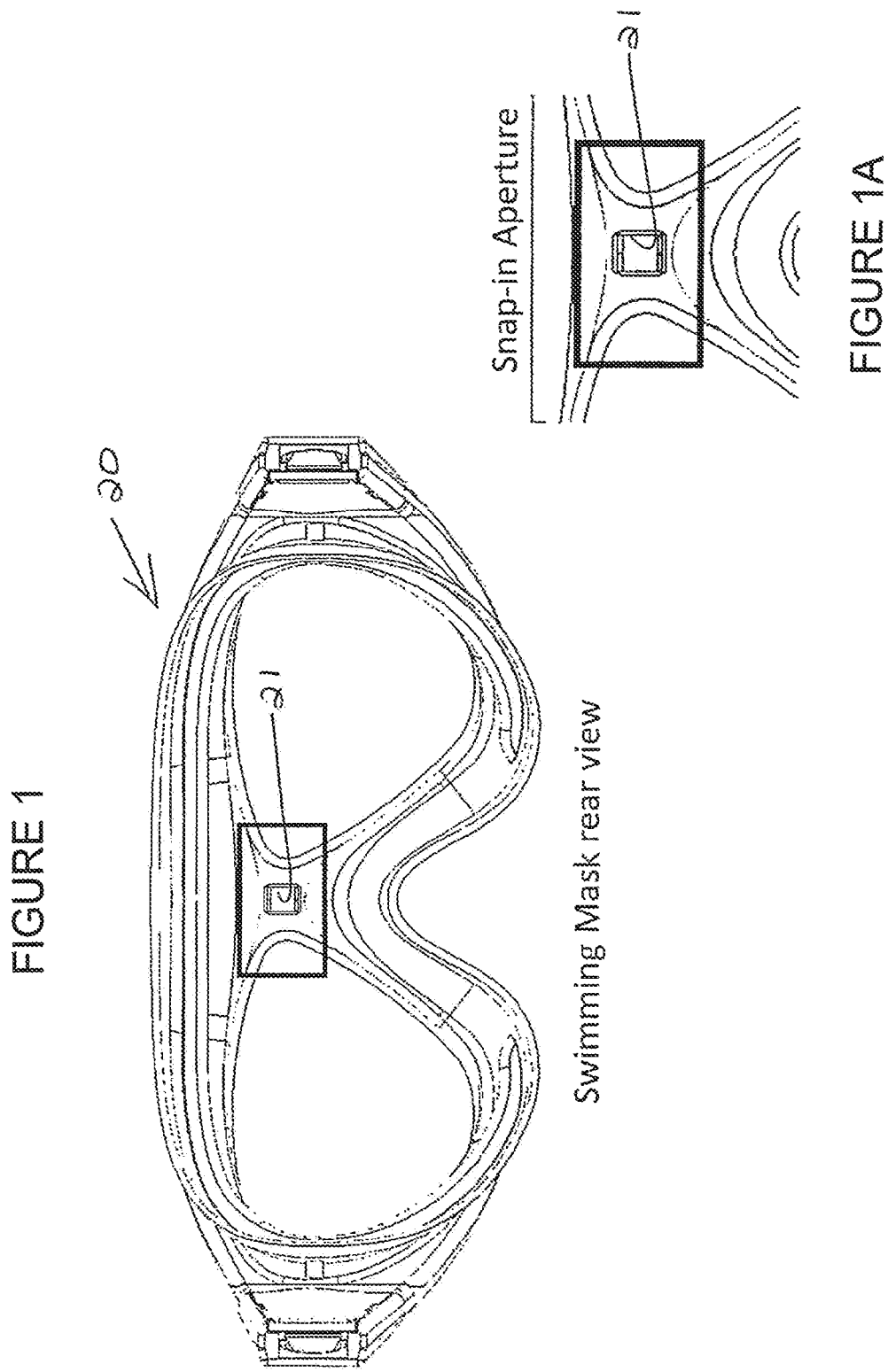
FIG. 1 is a rear view of a swimming mask according to the present invention, with fitting point aperture for snap-in inner frame suitable for containing ophthalmic corrective lenses to wearers individual prescription.

The inner frame 10 shown in FIGS. 3 to 6A is so designed that it can have snap-fit engagement with either the swimming mask 20 of FIG. 1 or the diving mask 30 of FIG. 2. The overall features of the swimming mask 20 and the diving mask 30 are of generally conventional form and will be readily apparent from a study of the drawings. A detailed description thereof is therefore not included.

Figure 4A:
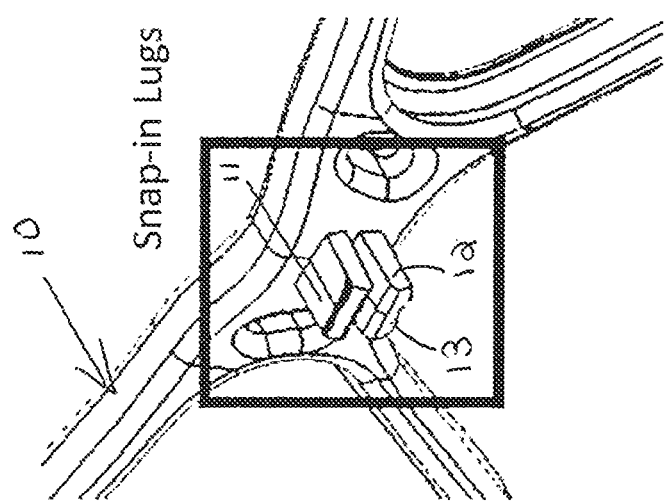
FIG. 4A is a corresponding detail view of part of the inner frame.
Figure 4:
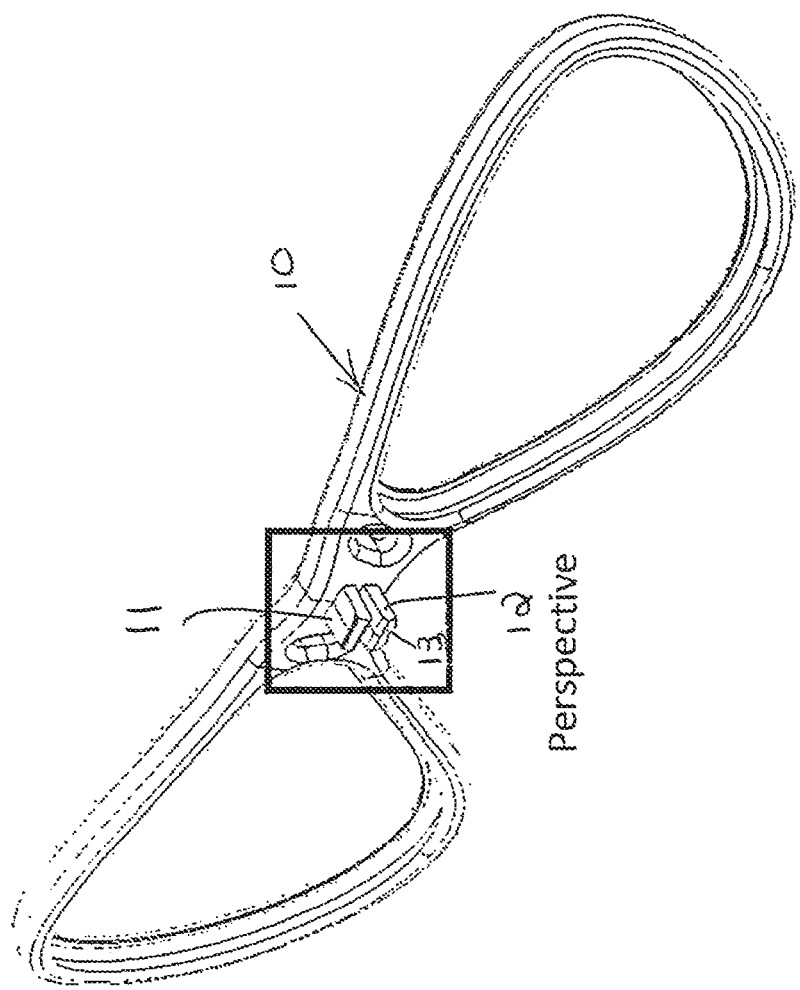
FIG. 4 is a perspective view of the inner frame according to the present invention, capable of being fitted with ophthalmic corrective lenses to wearers individual prescription.
Figure 6A:
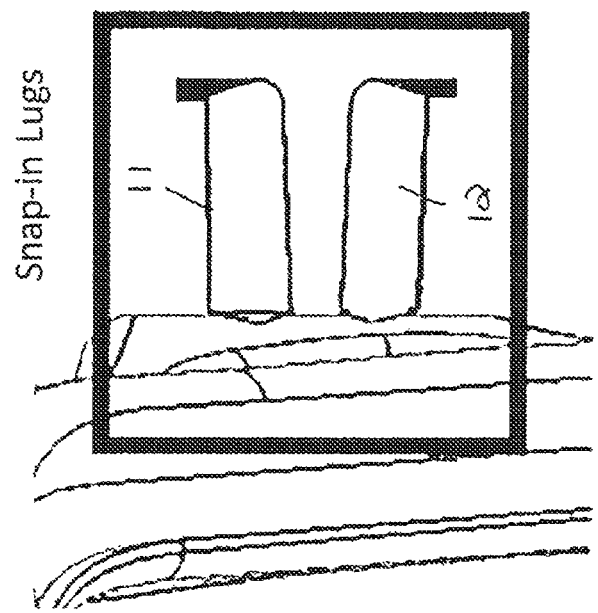
FIG. 6A is a corresponding detail view of part of the inner frame.
Figure 6:
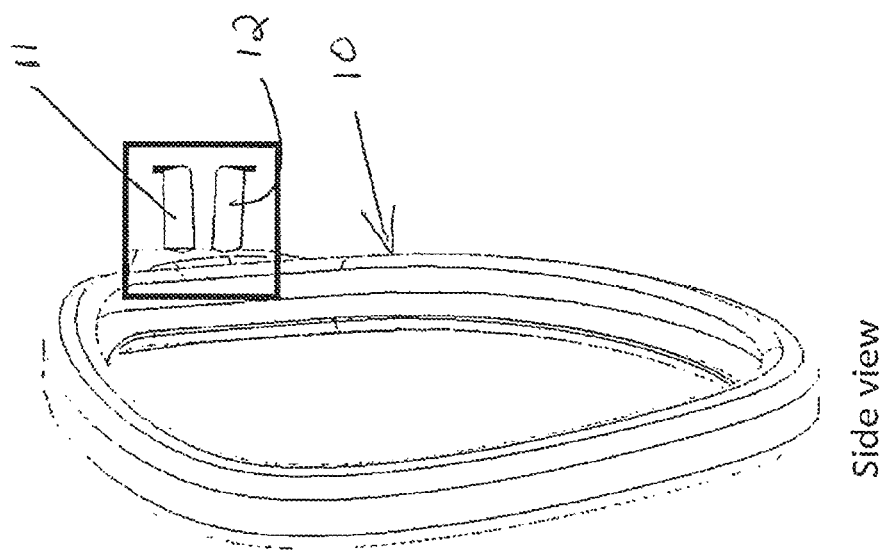
FIG. 6 is a side view of the inner frame according to the present invention, capable of being fitted with ophthalmic corrective lenses to wearers individual prescription.
Figure 7:
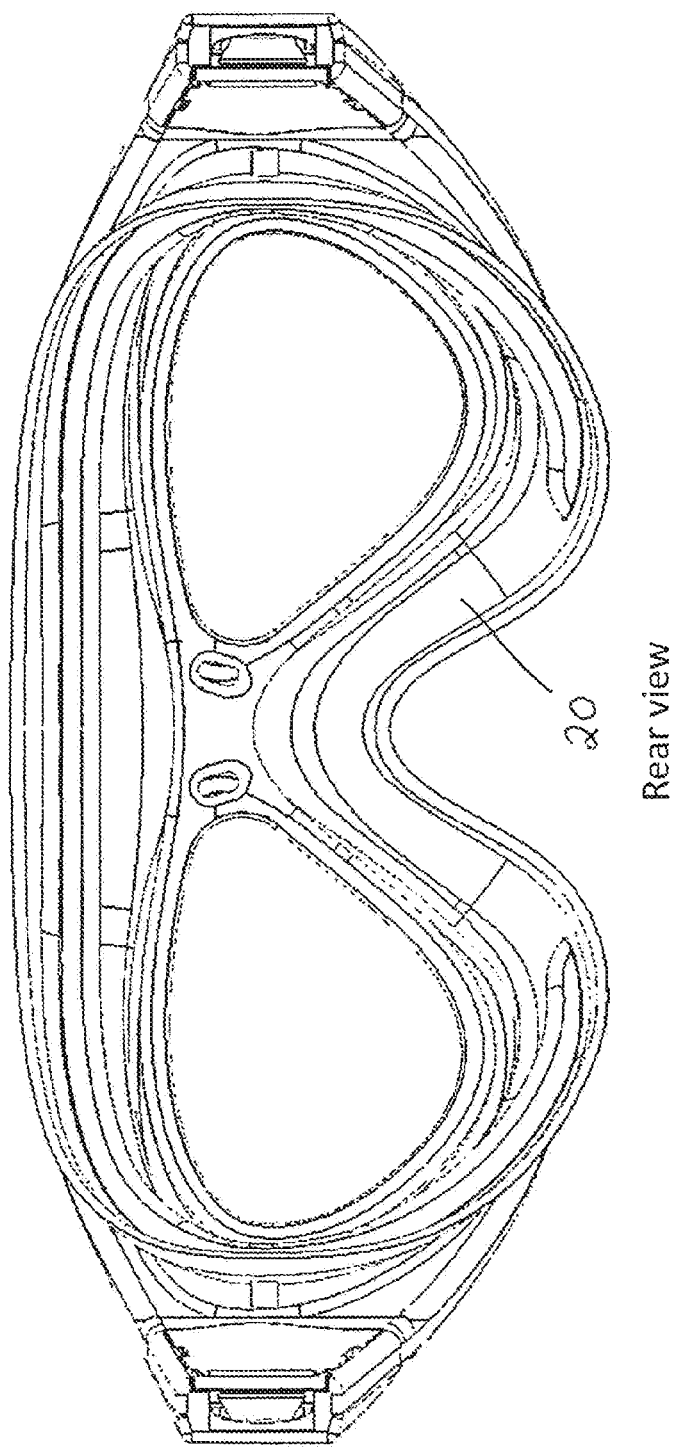
FIG. 7 is a rear view of the swimming mask of FIG. 1 with the inner frame fitted in position.

The inner frame 10 is fitted (or capable of being fitted) with ophthalmic corrective lenses to the wearer's individual prescription and includes a pair of centrally disposed, resiliently deformable projecting lugs 11 and 12 which are parallel to one another and have slanting end surfaces 13 (as can be seen from the drawings, particularly FIGS. 4 and 4A).

The swimming mask 20 of FIG. 1 and the diving mask 30 of FIG. 2 each have a centrally disposed rectangular section aperture 21 or 31 of such size that it can receive the protruding lugs 11 and 12 of the inner frame 10 as a snap-fit engagement.

The arrangement is thus such that the wearer can engage his or her inner frame 10 with either a swimming mask 20 or a diving mask 30 by snap-fitting the protrusion afforded by the protruding lugs 11 and 12 in the respective aperture 21 or 31.

The arrangement is also such that a manufacturer of inner frames and swimming masks and/or diving masks can be confident that, whichever inner frame 10 a customer may use with his or her swimming mask 20 or diving mask 30, the two components will have positive snap-fit engagement with one another.

What is claimed is:

1. An aquatic mask comprising:
   a) an outer mask structure including a pair of spaced lenses,
   b) a generally rectangular cross-section aperture formed in the outer mask structure between the two lenses,
   c) an inner frame including a pair of corrective lenses, and
   d) a protrusion extending forwardly from the inner frame between the two corrective lenses, the protrusion comprising a pair of resiliently deformable substantially parallel lugs that have a push-fit engagement in the aperture in the outer mask structure.

* * * * *